United States Patent
Inbe et al.

(10) Patent No.: US 9,096,935 B2
(45) Date of Patent: Aug. 4, 2015

(54) SURFACE CONDITIONING COMPOSITION, METHOD FOR PRODUCING THE SAME, AND SURFACE CONDITIONING METHOD

(75) Inventors: Toshio Inbe, Tokyo (JP); Yusuke Wada, Tokyo (JP); Masanobu Futsuhara, Tokyo (JP)

(73) Assignee: Chemetall GmbH, Frankfurt am Main (DE)

(*) Notice: Subject to any disclaimer, the term of this patent is extended or adjusted under 35 U.S.C. 154(b) by 0 days.

(21) Appl. No.: 13/414,449

(22) Filed: Mar. 7, 2012

(65) Prior Publication Data

US 2012/0160372 A1    Jun. 28, 2012

Related U.S. Application Data

(63) Continuation of application No. 12/295,821, filed as application No. PCT/JP2007/058220 on Apr. 9, 2007, now abandoned.

(30) Foreign Application Priority Data

Apr. 7, 2006  (JP) .................................. 2006-106388

(51) Int. Cl.
| | |
|---|---|
| C23C 22/78 | (2006.01) |
| C23C 22/60 | (2006.01) |
| C23C 22/68 | (2006.01) |
| C09D 5/00 | (2006.01) |
| C09D 5/10 | (2006.01) |
| C23C 22/48 | (2006.01) |

(52) U.S. Cl.
CPC ................ *C23C 22/78* (2013.01); *C09D 5/002* (2013.01); *C09D 5/106* (2013.01); *C23C 22/60* (2013.01); *C23C 22/68* (2013.01)

(58) Field of Classification Search
CPC ........ C23C 22/07; C23C 22/08; C23C 22/10; C23C 22/12–22/18; C23C 22/182; C23C 22/184; C23C 22/186; C23C 22/188; C23C 22/20; C23C 22/22–22/23; C23C 22/48; C23C 22/60; C23C 22/68; C23C 22/78
USPC .................................................. 148/253–263
See application file for complete search history.

(56) References Cited

U.S. PATENT DOCUMENTS

| | | | |
|---|---|---|---|
| 6,214,132 B1 | 4/2001 | Nakayama et al. | |
| 6,361,623 B1 | 3/2002 | Ishikura | |

(Continued)

FOREIGN PATENT DOCUMENTS

| | | |
|---|---|---|
| EP | 1 378 586 A1 | 1/2004 |
| EP | 1 566 466 A | 8/2005 |

(Continued)

*Primary Examiner* — Lois Zheng
(74) *Attorney, Agent, or Firm* — Norton Rose Fulbright US LLP

(57) ABSTRACT

A surface conditioning composition for use in surface conditioning of a metal prior to being subjected to a phosphate-based chemical conversion treatment, in which the surface conditioning composition has a pH of 3 to 12, and includes at least one kind of zinc compound particles selected from the group consisting of zinc oxide particles, zinc hydroxide particles, and basic zinc carbonate particles; phosphoric acid and/or condensed phosphoric acid; and an amine compound having a specific structure and in which the zinc compound particles are dispersed and stabilized by the phosphoric acid and/or condensed phosphoric acid, and the amine compound.

15 Claims, 4 Drawing Sheets

(56) References Cited

U.S. PATENT DOCUMENTS

| | | |
|---|---|---|
| 7,767,111 B2 | 8/2010 | Nakazawa |
| 2004/0011429 A1 | 1/2004 | Miyamoto |
| 2005/0187326 A1 | 8/2005 | Nakazawa |

FOREIGN PATENT DOCUMENTS

| | | |
|---|---|---|
| JP | 10-245685 | 9/1998 |
| JP | 2000-096256 | 4/2000 |
| JP | 2002-060960 A | 2/2002 |
| WO | WO 98/39498 | 9/1998 |
| WO | WO 00/05066 | 2/2000 |

SURFACE CONDITIONING COMPOSITION, METHOD FOR PRODUCING THE SAME, AND SURFACE CONDITIONING METHOD

This application is a continuation of Ser. No. 12/295,821 filed Sep. 21, 2009, pending, hereby incorporated by reference for all purposes.

TECHNICAL FIELD

The present invention relates to a surface conditioning composition and a method for producing the same, and a surface conditioning method.

BACKGROUND ART

Automotive bodies, home electric appliances and the like have been manufactured with metal materials such as steel sheets, galvanized steel sheets, and aluminum alloys. In general, after subjecting to a chemical conversion treatment step as a pretreatment, a treatment such as coating is carried out. As the chemical conversion treatment, a treatment using phosphate is generally carried out. In the chemical conversion treatment with phosphate, a surface conditioning treatment is generally carried out as a pretreatment for allowing fine and dense phosphate crystals to be deposited on the metal material surface.

Examples of known surface conditioning compositions for use in such a surface conditioning treatment include treatment liquids containing titanium phosphate particles referred to as a Jernstedt salt, or bivalent or trivalent metal phosphate particles.

For example, a surface conditioning composition is disclosed which includes phosphate particles of at least one kind of bivalent or trivalent metals having a particle diameter of 5 μm or less, and an alkali metal salt or ammonium salt, or a mixture thereof, and which has a pH adjusted to be 4 to 13 (for example, see Patent Document 1).

Also, a surface conditioning composition is disclosed which includes at least one kind of phosphate particles selected from phosphate particles including one or more kind(s) of bivalent and/or trivalent metals, and a variety of accelerator (for example, see Patent Document 2).

[Patent Document 1] Japanese Unexamined Patent Application, First Publication No. Hei 10-245685
[Patent Document 2] Japanese Unexamined Patent Application, First Publication No. 2000-96256

DISCLOSURE OF THE INVENTION

Problems to be Solved by the Invention

However, in accordance with the development of novel materials and simplification of the treatment steps in recent years, there may be a case that such treatment liquids for surface conditioning cannot address satisfactorily. Hence, further improvement of performances of the surface conditioning composition, and improvement of the physical properties of the chemical conversion treatment-coating film obtained by the chemical conversion treatment therewith have been demanded.

For example, high-tensile steel sheets and the like have been known as conversion resistant metal materials, and it is difficult to obtain therefrom a conversion coating film having excellent corrosion resistance by a conventional chemical conversion treatment. Additionally, in the case in which multiple kinds of different metal materials are concurrently subjected to the chemical conversion treatment, the capability of the chemical conversion is significantly deteriorated in the vicinity of the portion where they are in contact. On the other hand, as the level demanded for corrosion resistance has recently been elevating also, formation of a more dense phosphate crystal coating film has been desired.

Furthermore, when zinc phosphate fine particles have been prepared to date, zinc phosphate was pulverized using a polar polymeric dispersant, in general, whereby a substantial period of time has been required for effecting the pulverization. Moreover, thus resulting conversion coating film is more dense than the conversion coating film obtained with a surface conditioning agent including titanium phosphate particles referred to as a Jernstedt salt; however, problems in unevenness of the conversion coating film and susceptibility in rust generation have been involved.

The present invention was made taking into account the current status mentioned above, and an object of the invention is to provide a surface conditioning composition having a surface conditioning function that is even more superior as compared with conventional compositions for surface conditioning.

Means for Solving the Problems

The present inventors thoroughly investigated the aforementioned problems to find a solution. Consequently, it was found that the foregoing problems can be solved by a surface conditioning composition in which at least one kind of zinc compound particles selected from the group consisting of zinc oxide particles, zinc hydroxide particles, and basic zinc carbonate particles are dispersed and stabilized by phosphoric acid and/or condensed phosphoric acid, and an amine compound having a specific structure. Accordingly, the present invention was accomplished. More specifically, aspects of the present invention are to provide the following.

In a first aspect of the present invention, a surface conditioning composition is provided for use in surface conditioning of a metal prior to being subjected to a phosphate-based chemical conversion treatment, in which the surface conditioning composition has a pH of 3 to 12, and includes at least one kind of zinc compound particles selected from the group consisting of zinc oxide particles, zinc hydroxide particles, and basic zinc carbonate particles; phosphoric acid and/or condensed phosphoric acid; and an amine compound represented by the following general formula (1) and in which the zinc compound particles are dispersed and stabilized by the phosphoric acid and/or condensed phosphoric acid, and the amine compound.

$$\begin{matrix} R^2 \\ \phantom{R^2}\diagdown \\ \phantom{R^2}\phantom{\diagdown}N\text{—}R^1 \\ \phantom{R^2}\diagup \\ R^3 \end{matrix} \qquad (1)$$

in which, $R^1$, $R^2$, and $R^3$ each independently represent a hydrogen atom, a straight or branched alkyl group having 1 to 10 carbon atoms, or a straight or branched alkyl group having 1 to 10 carbon atoms and having a hydrophilic functional group in the skeleton thereof. However, $R^1$, $R^2$, and $R^3$ are not all a hydrogen atom.

In a second aspect of the present invention, a surface conditioning composition according to the first aspect is provided in which the zinc compound particles are dispersed and stabilized by a dispersion means in an aqueous solution containing the phosphoric acid and/or condensed phosphoric acid, and the amine compound, and has a pH of 7 to 13.

In a third aspect of the present invention, a surface conditioning composition according to the first or second aspect is provided in which the condensed phosphoric acid is pyrophosphoric acid.

In a fourth aspect of the present invention, a surface conditioning composition according to any one of the first to third aspects is provided in which the zinc compound particles have an average particle diameter from 0.05 μm to 3 μm.

In a fifth aspect of the present invention, a surface conditioning composition according to any one of the first to fourth aspects is provided in which the hydrophilic functional group is a hydroxyl group.

In a sixth aspect of the present invention, a surface conditioning composition according to any one of the first to fifth aspects is provided in which the amine compound is tertiary alkanolamine.

In a seventh aspect of the present invention, a surface conditioning composition according to any one of the first to sixth aspects further includes at least one selected from the group consisting of an aromatic organic acid, a phenolic compound, and a phenolic resin.

In an eighth aspect of the present invention, a surface conditioning composition according to any one of the first to seventh aspects further includes at least one selected from the group consisting of a clay compound, fine particles of an oxide, and a water soluble thickening agent.

In a ninth aspect of the present invention, a surface conditioning composition according to any one of the first to eighth aspects further includes at least one selected from the group consisting of a water soluble carboxyl group-containing resin, a saccharide, and a phosphonic acid compound.

In a tenth aspect of the present invention, a surface conditioning composition according to any one of the first to ninth aspects further includes a chelating agent and/or a surfactant.

In an eleventh aspect of the present invention, a surface conditioning composition according to any one of the first to tenth aspects further includes a zirconium complex ion and/or an oxidized metal ion.

In a twelfth aspect of the present invention, a surface conditioning method is provided for use in the conditioning of a surface of a metal prior to being subjected to a phosphate-based chemical conversion treatment, in which the method includes a step of bringing a surface conditioning composition according to any one of the first to eleventh aspects into contact with the surface of the metal.

In a thirteenth aspect of the present invention, a method for production of a surface conditioning composition is provided for use in the surface conditioning of a metal prior to being subjected to a phosphate-based chemical conversion treatment, in which the method includes a step of allowing at least one kind of zinc compound particle selected from the group consisting of zinc oxide particles, zinc hydroxide particles, and basic zinc carbonate particles to be dispersed and stabilized by a dispersion means in an aqueous solution having a pH of 7 to 13 and containing phosphoric acid and/or condensed phosphoric acid, and an amine compound represented by the following general formula (1).

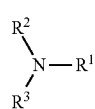

(1)

in which, $R^1$, $R^2$, and $R^3$ each independently represent a hydrogen atom, a straight or branched alkyl group having 1 to 10 carbon atoms, or a straight or branched alkyl group having 1 to 10 carbon atoms and having a hydrophilic functional group in the skeleton thereof. However, $R^1$, $R^2$, and $R^3$ are not all a hydrogen atom.

Effect of the Invention

According to the present invention, a surface conditioning composition having an even more superior surface conditioning function as compared with conventional surface conditioning compositions can be provided.

PREFERRED MODE FOR CARRYING OUT THE INVENTION

Embodiments of the present invention are explained below in detail.

Surface Conditioning Composition

The surface conditioning composition according to the present embodiment is for use in surface conditioning of a metal prior to being subjected to a phosphate-based chemical conversion treatment, and is characterized by including zinc compound particles which were dispersed and stabilized. More specifically, the composition includes at least one kind of zinc compound particle selected from the group consisting of zinc oxide particles, zinc hydroxide particles, and basic zinc carbonate particles, which are highly distinct in terms of not being zinc phosphate particles included in conventionally general compositions for surface conditioning. The surface conditioning composition according to the present embodiment is arbitrarily diluted with water to give a surface conditioning treatment liquid (treatment bath), which is utilized in surface conditioning of a metal prior to being subjected to a phosphate-based chemical conversion treatment.

pH

The surface conditioning composition according to the present embodiment has a pH of 3 to 12. When the pH of the surface conditioning composition is higher than 12, zinc may be dissolved, resulting in the deterioration of the surface conditioning function. While in the case of the pH being lower than 3, the surface conditioning function may also be deteriorated. In addition, in adjusting the pH, for example, NaOH or other commonly used compounds may be used to adjust the pH to fall with in the above range. In other words, the pH falling within the range in which zinc is insoluble is acceptable. Although favorable performances may be achieved when the pH is approximately 12, an extremely large amount of alkali is required. When the pH is less than 7, the iron sheet may rust, and repulsive force among particles may be impaired, whereby the stability and chemical conversion properties are likely to be deteriorated. Accordingly, it is preferred that the pH be 7 to 11.

Zinc Compound Particle

As described above, the zinc compound particles included in the surface conditioning composition according to the present embodiment are at least one selected from the group consisting of zinc oxide particles, zinc hydroxide particles, and basic zinc carbonate particles. In other words, a completely novel surface conditioning composition is provided in which zinc phosphate particles are not used as the main ingredient as in conventional surface conditioning compositions, but the aforementioned zinc compound particles are used as main ingredients. These zinc compound particles are dispersed and stabilized by coordination of the phosphoric acid and/or condensed phosphoric acid, and the amine compound having a specific structure described later.

Figure 1:
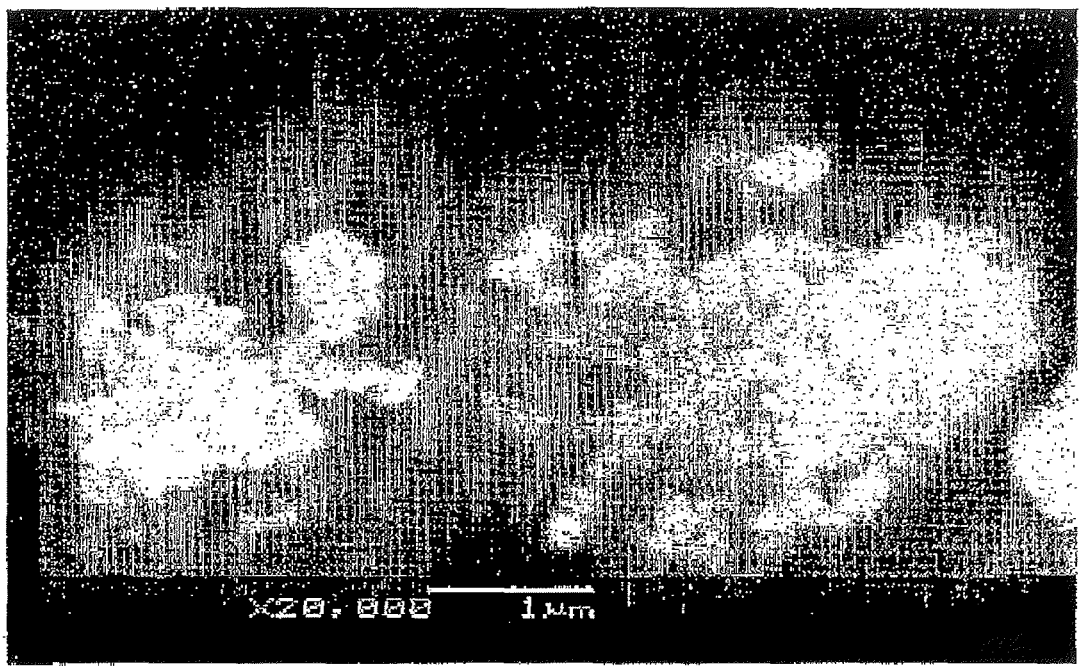
FIG. 1 shows an SEM image of zinc phosphate particles of the present embodiment.

It is preferred that the zinc compound particles be fine particles having an average particle diameter from 0.05 μm to 3 μm. In addition, the shape thereof is nearly spherical and uniform (see, FIG. 1). According to conventional surface conditioning compositions, in the case in which zinc phosphate particles that are fine having an average particle diameter as small as from 0.05 μm to 3 μm, it was required to use an alkali metal salt, negatively charged fine particles of an oxide, and a special dispersant such as a water soluble organic polymer for the purpose of preventing aggregation, sedimentation and the like; however, such a dispersant is not essential in the surface conditioning composition according to the present embodiment. Thus, stabilization of the dispersion is enabled without using a dispersant such as a saccharide, organic phosphonic acid, vinyl acetate, polyacrylic acid, or the like. However, use of such a dispersant is not precluded, but such a dispersant can be also used. Although use of such a dispersant is preferred in light of further improvement of dispersibility of the zinc compound particles, such a dispersant may decrease corrosion resistance when it is incorporated in a coating film. Therefore, it is preferred that the dispersant is not used, or used in a small amount when it is used.

Figure 2:
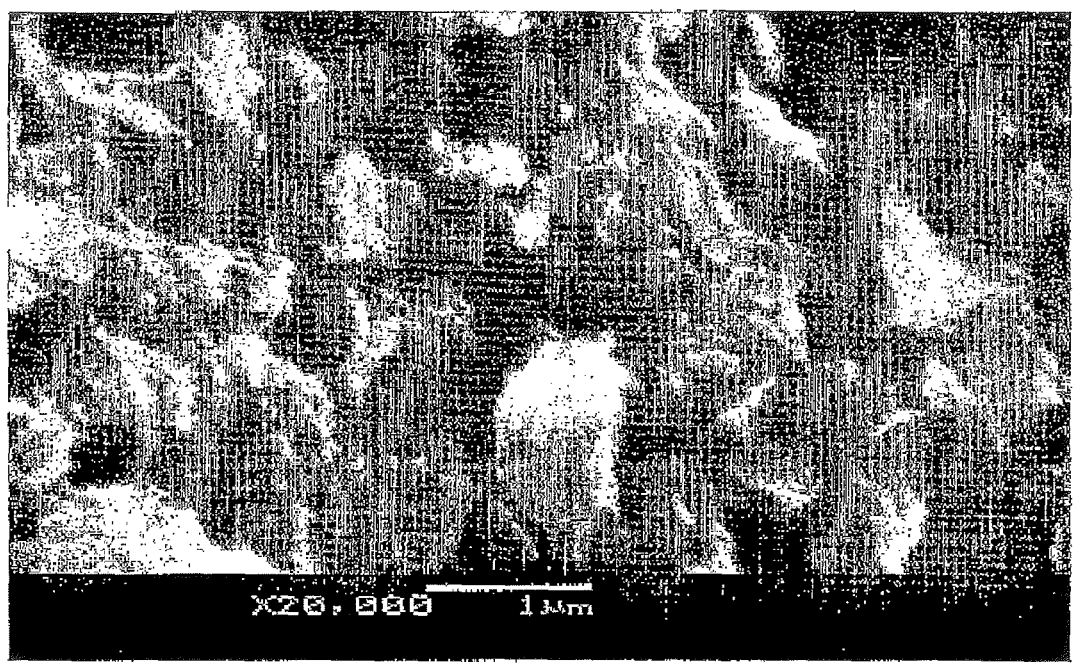
FIG. 2 shows an SEM image of conventional zinc phosphate particles.

More particularly, since the zinc compound particles used in the present embodiment have a nearly spherical uniform shape, use of the dispersant as described above is not required. In other words, the zinc phosphate particles included in conventional surface conditioning compositions have a nonuniform shape because they are produced by finely pulverizing commercially available zinc phosphate (see, FIG. 2), but in contrast, since the zinc compound particles of the present embodiment have a shape that is nearly spherical and uniform, repulsive force among the zinc compound particles that are present in the surface conditioning composition acts efficiently, thereby resulting in stable dispersion irrespective of being fine, particles. Therefore, the surface conditioning composition according to the present embodiment can avoid the occurrence of aggregation and sedimentation without the use of the special dispersant as described above.

As in the foregoing, the zinc compound particle used in the present embodiment has an average particle diameter from 0.05 μm to 3 μm, but preferably from 0.1 μm to 0.5 μm. When the average particle diameter of the zinc compound particle is less than 0.05 μm, a particular method of the dispersion is needed, and in addition, a long period of time may be required for the dispersion. Nevertheless, chemical conversion properties as well as stability are less likely to be altered. In contrast, when the zinc compound particles have an average particle diameter of greater than 3 μm, a fine zinc phosphate crystal coating film cannot be formed. The term "dispersion stability" referred to herein indicates that the zinc compound particles do not aggregate or sediment, even though they have been stored for a predetermined time.

The zinc compound particles of the present embodiment having a small particle diameter, and having a nearly spherical uniform shape are readily obtained by carrying out dispersion and stabilization by a dispersion means in a neutral or basic aqueous solution containing the phosphoric acid and/or condensed phosphoric acid, and the amine compound having a specific structure described later. Specifically, they are obtained by allowing the aforementioned zinc compound particles to be dispersed using a dispersion means such as beads dispersion for dispersion and stabilization in an aqueous solution that contains the phosphoric acid and/or condensed phosphoric acid, and the amine compound having a specific structure in a specified amount and has a pH of 7 to 13.

With respect to the mixing ratio of the zinc compound particles, and the phosphoric acid and/or condensed phosphoric acid, it is preferred that the mass ratio of the zinc element/phosphorus element falls within the range of 0.3 to 30. When this mass ratio is less than 0.3, the efficiency of dispersion may be reduced because a large amount of alkali is required for maintaining the pH. In addition, when the weight ratio is greater than 30, the zinc compound particles may not be dispersed sufficiently. The mass ratio is more preferably 1 to 10.

The dispersion means used in the present embodiment is not particularly limited, but conventionally known dispersion means may be employed. Specific examples of the means include bead mills typified by disc type, and pin type, high-pressure homogenizers, ultrasonic dispersion machines and the like.

The aqueous solution has a pH of 7 to 13, and preferably 7.5 to 10. When the pH is lower than 7, the zinc compound particles may be dissolved, leading to progress of the reaction with coexisting phosphoric acid or condensed phosphoric acid whereby zinc phosphate may be produced. In contrast, when the pH is higher than 13, a strong alkaline component is required in a large quantity, whereby the dispersibility may be deteriorated.

The condensed phosphoric acid is believed to be readily coordinated with the zinc compound particle in terms of the chemical structure when compared with phosphoric acid; however, when the degree of condensation is too high, an improvement of the dispersion stability cannot be expected to the contrary because it becomes difficult to be coordinated. Therefore, as the condensed phosphoric acid, one having a low degree of condensation is preferably used, and pyrophosphoric acid in particularly is preferably used. When pyrophosphoric acid is used, more superior dispersion stability is achieved compared to the case in which phosphoric acid is used. This is speculated to result from the fact that pyrophosphoric acid has a chelating effect that captures hardening components such as magnesium ions and calcium ions in tap water. Therefore, when pyrophosphoric acid is used, aggregation and sedimentation of the zinc compound particles can also be prevented in the case in which the hardening components in tap water contaminate the surface conditioning composition.

Amine Compound (a)

The zinc compound particles are dispersed and stabilized by the amine compound (a) represented by the following general formula (1). The dispersion stability of the zinc compound particles can be improved, and the denser zinc phosphate film can be formed, by dispersing the above described zinc compound particle in the presence of this amine compound (a), and phosphoric acid and/or condensed phosphoric acid described above.

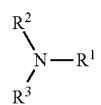

(1)

in which, $R^1$, $R^2$, and $R^3$ each independently represent a hydrogen atom, a straight or branched alkyl group having 1 to 10 carbon atoms, or a straight or branched alkyl group having 1 to 10 carbon atoms and having a hydrophilic functional group in the skeleton thereof; however, $R^1$, $R^2$, and $R^3$ are not all a hydrogen atom.

With respect to the mechanism by which the amine compound (a) having the above structure achieves a favorable property as a dispersant, it is speculated to result from its chemical structure. Specifically, the amine compound (a) described above has a nitrogen atom including a lone electron pair, and has a low molecular weight; therefore, it is speculated that the nitrogen atom is coordinated on the surface of the zinc phosphate particle, thereby enhancing the dispersion stability. When the amine compound (a) has additional hydrophilic functional groups in its skeleton, the dispersion stability is further enhanced.

The surface conditioning composition according to the present embodiment is advantageous in that it can be stored for a long period of time, even in the state of a concentrated liquid because the zinc compound particles exhibit high dispersion stability. The stability of the surface conditioning treatment liquid (treatment bath) obtained by diluting the surface conditioning composition is also favorable. Furthermore, it is superior in achieving an effect to provide favorable chemical conversion properties in the chemical conversion reaction, and thus, a conversion coating film of a sufficient amount can be formed even in the case in which it is applied to conversion resistant metal materials such as high-tensile steel sheets and the like.

The abovementioned amine compound (a) is not particularly limited as long as it is an amine compound represented by the abovementioned general formula (1). The hydrophilic group in the general formula (1) is not particularly limited, but may be, for example, a hydroxyl group, carboxyl group, sulfonic acid group, amino group and the like. Among these, a hydroxyl group is preferable, and tertiary alkanolamine is particularly preferably used.

Specific examples of the amine compound (a) include triethylamine, ethylenediamine, 2-ethyldiamine, tri-n-butylamine, n-propylamine, triethylenetetramine, hydrazine, taurine, adipic acid dihydrazide and the like, as well as amino carboxylic acids such as NTA (Nitrilo Triacetic Acid), DTPA (Diethylene Triamine Pentaacetic Acid), EDTA (Ethylene Diamine Tetraacetic Acid), HIDA (Hydroxyethyl Imino Diacetic Acid), DHEG (Dihydroxyethyl Glycine), and the like.

Furthermore, examples of particularly preferably used amine compounds having a hydroxyl group include, for example, aliphatic hydroxyamine compounds such as monoethanolamine, diethanolamine, dimethylethanolamine, methyldiethanolamine, triethanolamine, triisopropanolamine and aminoethylethanolamine; aromatic amine compounds such as amine modified resol and amine modified novolak, and the like. These amine compounds may be used alone, or two or more thereof may be used in combination. Of these, in light of excellent adsorptivity to the zinc compound particles, resistance to secondary aggregation, and excellent dispersion stability in liquids, aliphatic hydroxyamine compounds are preferred, and diethanolamine, dimethylethanolamine and triethanolamine are more preferred.

With respect to the content of the amine compound (a), it is preferred that the lower limit be 0.01% by mass, and the upper limit be 1000% by mass on the basis of the mass of the zinc compound particle. When the content is less than 0.01% by mass, further enhancement of dispersion stability is not expected because the amount of adsorption to the zinc compound particle becomes insufficient, and also, an additional improvement of the surface conditioning function cannot be expected. Content greater than 1000% by mass is not economical because no effect exceeding the desired effect can be achieved. The lower limit is more preferably 0.1% by mass, while the upper limit is more preferably 100% by mass.

With respect to the amount of the amine compound (a) added, it is preferred that the lower limit be 0.1% by mass, and the upper limit be 50% by mass in the concentrated liquid. When the amount is less than 0.1% by mass, the dispersion stability may not be satisfactorily improved. When the amount is greater than 50% by mass, dispersibility may be deteriorated due to the influence of excess additive, and it would not be economical even if the dispersion was satisfactory. The lower limit is more preferably 0.5% by mass, while the upper limit is more preferably 20% by mass.

With respect to the content of the amine compound (a), it is preferred that the lower limit be 1 ppm and the upper limit be 10000 ppm in the surface conditioning treatment bath. When the content is less than 1 ppm, the amount of adsorption of the zinc compound particle may be insufficient, whereby secondary aggregation may be likely to occur. Content greater than 10000 ppm is not economical because no effect exceeding the desired effect can be achieved. The lower limit is more preferably 10 ppm, while the upper limit is more preferably 5000 ppm.

Compound (b): Aromatic Organic Acid, Phenolic Compound, Phenolic Resin

The surface conditioning composition according to the present embodiment preferably contains at least one selected from the group consisting of an aromatic organic acid, phenolic compound, and a phenolic resin. The compound (b) has an effect which allows the zinc compound particles to be dispersed and stabilized, similar to the amine compound (a) and the phosphoric acid and/or condensed phosphoric acid described above. Moreover, it has a particularly superior property as the surface conditioning agent in the chemical conversion treatment of aluminum-based substrates. More specifically, although conventional surface conditioning agents containing the zinc phosphate particles do not achieve a sufficient effect in the treatment of the aluminum-based substrate, the surface conditioning agent according to the present embodiment can form a favorable conversion coating film.

This may be caused for the following reasons. When a passive coating film constituted of a compound represented by the general formula: $Al(OH)_x$ is formed on the surface of general aluminum-based substrates, the surface conditioning function tends to be markedly deteriorated when surface conditioning is carried out using the surface conditioning composition. It is speculated to result from prevention of the reaction by the passive coating film of such a layer of aluminum hydroxide or the like.

In contrast, because the aforementioned compound (b) is a compound that has a high affinity for aluminum metal, it is speculated that the use of the compound (b) enables the zinc compound particles to stably adhere to the substrate surface, thus improving the surface conditioning function. In addition, because the compound (b) has a function to chelate cationic components in tap water, the time dependent stability of the treatment bath can be maintained.

The aromatic organic acid is not particularly limited, but benzoic acid, salicylic acid, gallic acid, lignosulfonic acid, and tannic acid are preferably used. Among these, gallic acid, lignosulfonic acid, and tannic acid in particularly are preferably used.

The phenolic compound is not particularly limited as long as it is a compound having a phenolic hydroxyl group. For example, phenol, catechol, pyrogallol, catechin and flavonoid are preferably used. Of these, catechin in particularly is preferably used.

The aforementioned flavonoid is not particularly limited, and examples thereof include flavone, isoflavone, flavonol, flavanone, flavanol, anthocyanidin, aurone, chalcone, epigallocatechin gallate, gallocatechin, theaflavin, daidzin, genistin, rutin, myricitrin, and the like.

Examples of the phenolic resin include polymers having the aromatic organic acid and/or the phenolic compound as a basic skeleton (for example, polyphenolic compounds including tannin, catechin and the like, polyvinyl phenol as well as water soluble resol, novolak resins and the like), and lignin, and the like.

The aforementioned tannin is a generic name of aromatic compounds which have a complicated structure having many phenolic hydroxyl groups, and which have widely distributed in the plant kingdom. The tannin may be either hydrolyzed tannin or condensed tannin. Examples of the tannin include hamameli tannin, persimmon tannin, tea tannin, oak gall tannin, gall nut tannin, myrobalan tannin, divi-divi tannin, algarovilla tannin, valonia tannin, catechin tannin, and the like. The tannin may also be hydrolyzed tannin yielded by decomposition with a process such as hydrolysis or the like of tannin found in a plant. Additionally, examples of the tannin which can be used also include commercially available ones such as e.g., "Tannic acid extract A", "B tannic acid", "N tannic acid", "Industrial tannic acid", "Purified tannic acid", "Hi tannic acid", "F tannic acid", "Official tannic acid" (all manufactured by Dainippon Pharmaceutical Co., Ltd.), "Tannic acid: AL" (manufactured by Fuji Chemical Industry Co., Ltd.), and the like. Two or more kinds of tannin may be concurrently used. For reference, the aforementioned lignin is a network polymer compound involving a phenol derivative, to which a propyl group is bound as a base unit.

With respect to total content of the compound (b), it is preferred that the lower limit be 0.01% by mass, and the upper limit be 1000% by mass on the basis of the mass of the zinc compound particles at the metal material surface treatment. When the content is less than 0.01% by mass, the amount of adsorption to the zinc compound particles becomes insufficient; therefore, the effect of stabilizing the dispersion and effect of adsorption of the zinc compound particles to the metal material cannot be anticipated, and thus, the surface conditioning effect may not be achieved. Content greater than 1000% by mass is not economical because no effect exceeding the desired effect can be achieved. The lower limit is more preferably 0.1% by mass, while the upper limit is more preferably 100% by mass.

With respect to total amount of the compound (b) added, it is preferred that the lower limit be 0.1% by mass, and the upper limit be 50% by mass in the concentrated liquid. When the amount is less than 0.1% by mass, the dispersion may not be satisfactorily executed. When the amount is greater than 50% by mass, dispersibility may be deteriorated due to the influence of excess additive, and would not be advantageous economically, even if the dispersion were satisfactory. The lower limit is more preferably 0.5% by mass, while the upper limit is more preferably 20% by mass.

With respect to total content of the compound (b), it is preferred that the lower limit be 1 ppm, and the upper limit be 10000 ppm in the surface conditioning treatment liquid (treatment bath). When the content is less than 1 ppm, the amount of adsorption to the zinc compound particles may be insufficient, whereby secondary aggregation may be likely to occur. Content greater than 10000 ppm is not economical because no effect exceeding the desired effect can be achieved. The lower limit is more preferably 10 ppm, while the upper limit is more preferably 5000 ppm.

Compound (c): Clay Compound, Fine Particle of an Oxide, Water Soluble Thickening Agent It is preferred that the surface conditioning composition according to the present embodiment further contains at least one compound (c) selected from the group consisting of a clay compound, fine particles of an oxide, and a water soluble thickening agent.

The compound (c) greatly improves the chemical conversion property through addition to the surface conditioning composition of the present invention. Furthermore, it is speculated to be responsible for stabilization by way of interactions such as adsorption with the zinc compound particles, thereby contributing to stability during storage in the state of an aqueous dispersion liquid (concentrated liquid before use in surface conditioning) for a long period of time, stability of the surface conditioning treatment bath, and stability against hardening components such as calcium ions, magnesium ions, and the like derived from tap water.

Additionally, it is speculated that the zinc compound particles become more resistant to sedimentation when compared with the case in which the compound (c) is not used because the thickening effect is presumed to result from the compound (c) since the compound (c) interacts with the zinc compound particles. Therefore, by further including the compound (c), crystals of more dense conversion coating film can be formed on the surface of a variety of metal materials. In particular, with respect to cold-rolled steel sheets, and galvanized steel sheets, it is preferred in light of ability to uniformly and finely cover the entire face of the metal material.

The aforementioned clay compound is not particularly limited, and examples thereof include smectites such as montmorillonite, beidellite, saponite, and hectorite; kaolinites such as kaolinite, and halloysite; vermiculites such as dioctahedral vermiculite, and trioctahedral vermiculite; micas such as teniolite, tetrasilicic mica, muscovite, illite, sericite, phlogopite, and biotite; hydrotalcite; pyrophillite; layered polysilicates such as kanemite, makatite, ilerite, magadiite, and kenyaite, and the like. These clay compounds may be either a naturally occurring mineral, or a synthetic mineral yielded by hydrothermal synthesis, a melt process, a solid phase process or the like.

Furthermore, it is preferred that the average particle diameter of the clay compound in the dispersed state in water be 0.1 μm or less. When a clay compound having an average particle diameter in the dispersed state in water of greater than 0.1 μm is employed, dispersion stability may be deteriorated. Additionally, the average aspect ratio (mean value of maximum size/minimum size) of the clay compound is more preferably 10 or greater, and still more preferably 20 or greater. When the average aspect ratio is less than 10, the dispersion stability may be deteriorated. The aforementioned average particle diameter in the dispersed state in water can be determined by TEM or SEM following lyophilization of the water dispersion liquid. Also, two or more of these may be concurrently used.

Additionally, intercalation compounds of the aforementioned clay compound (pillared crystals and the like), as well as those subjected to an ion exchange treatment, and to surface modification such as a silane coupling treatment, a composite formation treatment with an organic binder, or the like, can also be used as needed. These clay compounds may be used alone, or two or more thereof may be used in combination. Examples of commercially available products of the saponite include synthetic saponite ("Sumecton SA", trade name, manufactured by KUNIMINE INDUSTRIES CO., LTD.), and the like. Examples of commercially available products of the natural hectorite include "BENTON EW" and "BENTON AD" (both manufactured by ELEMENTIS plc), and the like. Examples of commercially available products of the synthetic hectorite include trade names "Laponite B, S, RD, RDS, XLG, XLS" manufactured by ROOKWOOD Additives Ltd., and the like. These are in the state of a white powder, and readily form sol ("Laponite S, RDS, XLS") or gel ("Laponite B, RD, XLG") upon addition to water. Moreover, "Lucentite SWN" of CO-OP Chemical Co., Ltd. may be also exemplified. These natural hectorite and synthetic hectorite may be used alone, or two or more thereof may be used in combination.

The aforementioned fine particles of an oxide are not particularly limited, and examples thereof include silica particles, alumina particles, titania particles, zirconia particles, niobium oxide particles and the like. The oxide particles suitably have an average particle diameter of approximately 1 nm to 300 nm. These may be used alone, or two or more of them may be used in combination. Among these, in light of thixotropic properties, alumina particles or a silicic acid compound may be preferably used.

The aforementioned water soluble thickening agent is not particularly limited, and examples thereof include a swollen dispersion of fatty amide, amide-based fatty acid such as acrylamide, and polyamide-based thickening agents such as phosphate of long-chain polyaminoamide, urethane-based thickening agents, and polyethylene oxide. Among these, in light of low probability of inhibiting the chemical conversion, acrylamide, polyacrylic acid, acrylic acid copolymers are preferably used.

With respect to the content of the compound (c), it is preferred that the lower limit be 0.01% by mass, and the upper limit be 1000% by mass on the basis of the mass of the zinc compound particles. When the content is less than 0.01% by mass, the amount of adsorption to the zinc compound particles becomes insufficient, whereby the effect of adsorption of the particles to the metal material may not be sufficient, which may lead to incorrectly anticipating the effect of addition. Content greater than 1000% by mass is not economical because no effect exceeding the desired effect can be achieved. The lower limit is more preferably 0.1% by mass, while the upper limit is more preferably 100% by mass.

With respect to the amount of the compound (c) added, it is preferred that the lower limit be 0.1% by mass and the upper limit be 50% by mass in the concentrated liquid. When the amount is less than 0.1% by mass, the dispersion may not be satisfactory. When the amount is greater than 50% by mass, dispersibility may be deteriorated due to the influence of excess additive, and would not be economical even if the dispersion were satisfactory. The lower limit is more preferably 0.5% by mass, while the upper limit is more preferably 20% by mass.

With respect to the content of the compound (c), it is preferred that the lower limit be 1 ppm and the upper limit be 1000 ppm in the surface conditioning treatment bath. When the content is less than 1 ppm, the amount of adsorption to the zinc compound particles may be insufficient; therefore, adsorption and the like of the zinc compound particles to the metal material surface may not be facilitated. Content greater than 1000 ppm is not economical because no effect exceeding the desired effect can be achieved. The lower limit is more preferably 10 ppm, while the upper limit is more preferably 500 ppm.

It is preferred to include all of the compounds (a) to (c), as described above, in light of further stabilization of the zinc compound particles in an aqueous solution, adsorption of the particles to the basal plate, and stability in the concentrated liquid.

Moreover, a variety of components for use in the surface conditioning composition may be added to the aforementioned surface conditioning composition, in addition to the compounds as described above.

Compound (d)

The aforementioned surface conditioning composition according to the present embodiment may further include at least one compound (d) selected from the group consisting of a water soluble carboxyl group-containing resin, a saccharide, and a phosphonic acid compound.

The compound (d) tends to be negatively charged in a solution, and adhesion or the like of the same to the surface of the zinc compound particles may result in electromagnetic repulsion. It is speculated that reaggregation of the zinc compound particles is suppressed as a consequence, facilitating adhesion on the metal material surface of the crystal nucleus at a uniform density, and thus a phosphate coating film of a sufficient amount is able to be formed on the metal material surface in the chemical conversion treatment.

The aforementioned compound (d) not only suppresses sedimentation of the zinc compound particles in the surface conditioning composition, but also suppresses sedimentation of the zinc compound particles in the aqueous dispersion liquid of the zinc compound particles (concentrated liquid before use in surface conditioning). Accordingly, long-term storage stability of the concentrated liquid can be maintained.

The water soluble carboxyl group-containing resin is not particularly limited as long as it is a water soluble resin, and examples thereof include resins obtained by polymerization of a monomer composition containing a carboxyl group-containing an ethylenic unsaturated monomer such as (meth)acrylic acid, maleic acid, fumaric acid, and the like. The water soluble carboxyl group-containing resin is preferably a resin that is obtained by radical polymerization of an ethylenic unsaturated monomer composition and has an acid value of 10 to 500. By using such a resin, the dispersion stability of the zinc compound particles can be further enhanced. The water soluble carboxyl group-containing resin may be a commercially available product; for example; "Aron A12SL" (manufactured by Toagosei Chemical Industry Co., Ltd.) can be used.

The aforementioned saccharide is not particularly limited, and examples thereof include polysaccharides, polysaccharide derivatives, and alkali metal salts such as sodium salts and potassium salts of the same, and the like. Examples of the polysaccharide include cellulose, methyl cellulose, ethyl cellulose, methylethyl cellulose, hemicellulose, starch, methyl starch, ethyl starch, methylethyl starch, agar, carrageen, alginic acid, pectic acid, guar gum, tamarind seed gum, locust bean gum, konjac mannan, dextran, xanthan gum, pullulan, gellan gum, chitin, chitosan, chondroitin sulfate, heparin, hyaluronic acid, and the like. Moreover, examples of the polysaccharide derivative include the carboxyalkylated or hydroxyalkylated polysaccharides described above such as carboxymethyl cellulose (CMC) and hydroxyethyl cellulose, starch glycolic acid, agar derivatives, carrageen derivatives, and the like.

Examples of the phosphonic acid compound include phosphonic acid, and products yielded by direct binding of a carbon atom with a phosphorus atom, as well as amine salts or ammonium salts thereof, excluding phosphoric acid esters.

In the surface conditioning composition as described above, the content of the compound (d) is preferably from 0.01% to 1000% by mass per mass of the zinc compound particles. When the content is less than 0.01% by mass the effect of preventing sedimentation may not be sufficient. Content greater than 1000% by mass is not economical because no effect exceeding the desired effect can be achieved. The concentration is more preferably from 0.1% to 100% by mass.

Furthermore, the content of the compound (d) in the concentrated liquid is preferably from 0.1% to 40% by mass.

The content of the compound (d) is preferably from 1 ppm to 1000 ppm in the surface conditioning treatment bath. When the content is less than 1 ppm, the effect of preventing sedimentation may not be sufficiently achieved. Content greater than 1000 ppm is not economical because no effect exceeding the desired effect can be achieved. The concentration is more preferably from 10 ppm to 500 ppm.

Compound (e)

The surface conditioning composition according to the present embodiment may further include a compound (e) that is a chelating agent and/or a surfactant. By including the compound (e), more superior dispersion stability can be imparted, and properties in dispersion stability can be also improved. More specifically, even in the case in which hardening components such as magnesium ions, calcium ions, and the like in tap water contaminate surface conditioning composition, the stability of the surface conditioning treatment bath can be maintained without aggregation of the zinc compound particles. Accordingly, the aforementioned chelating agent indicates a compound having the ability to capture the magnesium ions and calcium ions in an aqueous solution.

The aforementioned chelating agent is not particularly limited, and examples thereof include citric acid, tartaric acid, EDTA, gluconic acid, succinic acid and malic acid, and compounds and derivatives of the same.

The content of the chelating agent is preferably from 1 ppm to 10000 ppm in the surface conditioning treatment bath. When the content is less than 1 ppm, the hardening components in tap water cannot be sufficiently chelated, whereby metal polycations such as calcium ions, which serve as the hardening component, may cause the zinc compound particles to aggregate.

Content greater than 10000 ppm can achieve no effect exceeding the desired effect, and the chemical conversion properties may be deteriorated through a reaction with active ingredients in the chemical conversion liquid. The content is more preferably from 10 ppm to 1000 ppm.

As the aforementioned surfactant, an anionic surfactant or a nonionic surfactant may be more preferably used.

The aforementioned nonionic surfactant is not particularly limited, but nonionic surfactants having a hydrophilic-lipophilic balance (HLB) of at least 6 are preferred, and examples thereof include polyoxyethylene alkyl ether, polyoxyalkylene alkyl ether, polyoxyethylene derivatives, oxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamine, alkylalkanode amide, nonylphenol, alkylnonylphenol, polyoxyalkylene glycol, alkylamine oxide, acetylene diol, polyoxyethylene nonylphenyl ether, silicon based surfactants such as polyoxyethylene alkylphenyl ether-modified silicone, fluorine-based surfactants prepared through substitution of at least one hydrogen atom in a hydrophobic group of a hydrocarbon-based surfactant with a fluorine atom, and the like. Among these, polyoxyethylene alkyl ether and polyoxyalkylene alkyl ether are particularly preferred in light of further achieving the advantageous effect of the present invention.

The aforementioned anionic surfactant is not particularly limited, and examples thereof include fatty acid salts, alkylsulfuric acid ester salts, alkyl ether sulfuric acid ester salts, alkylbenzenesulfonate, alkylnaphthalenesulfonate, alkylsulfosuccinate, alkyldiphenyl ether disulfonate, polybisphenol sulfonate, alkyl phosphate, polyoxyethylalkyl sulfuric acid ester salts, polyoxyethylalkylallylsulfuric acid ester salts, alpha-olefin sulfonate, methyl taurine acid salts, polyaspartate, ether carboxylate, naphthalenesulfonic acid-formalin condensates, polyoxyethylene alkyl phosphoric acid esters, alkyl ether phosphoric acid ester salts, and the like. Among them, alkyl ether phosphoric acid ester salts are preferred in light of further achieving the advantageous effect of the present invention.

With respect to the content of the surfactant, it is preferred that the lower limit be 3 ppm, and the upper limit be 500 ppm in the surface conditioning treatment bath. When the content falls within the above range, the effect of the present invention can be favorably achieved. The lower limit is more preferably 5 ppm, while the upper limit is more preferably 300 ppm. The surfactant may be used alone, or two or more thereof may be used in combination.

Ion (f)

It is preferred that the surface conditioning composition further contains a Zr complex ion and/or an oxidized metal ion (f). The ion (f) may be preferably used in light of eliminating segregation products on the basal plate surface. The oxidized metal ion referred to herein indicates a metal ion having a higher valence in a metal having a plurality of valences. Specific examples include oxidized metal ions of Fe, Mn, Co, Ni, Ce, and the like.

The source of the Zr complex ion is not particularly limited, and examples thereof include zircon hydrofluoride, and zirconium ammonium carbonate; hydroxylated zirconium, zirconium oxycarbonate, basic zirconium carbonate, zirconium borate, zirconium oxalate, zirconium sulfate, zirconium nitrate, zirconyl nitrate, zirconium chloride and the like; and organic zirconium compounds such as dibutyl zirconium dilaurylate, dibutylzirconium dioctate, zirconium naphthenate, zirconium octylate and acetylacetone zirconium, and the like. Among these, zircon hydrofluoride, and zirconyl nitrate are preferably used in light of eliminating segregation products on the basal plate surface.

The source of the oxidized metal ion of Fe is not particularly limited, and examples thereof include water soluble ferric salts such as iron (III) sulfate, iron (III) nitrate, and iron (III) perchlorate; water soluble ferrous salts such as iron (II) sulfate, and iron (II) nitrate, and the like. Among these, ferric nitrate is preferably used in light of oxidation of the basal plate surface.

The source of the oxidized metal ion of Mn is not particularly limited, and examples thereof include organic acid salts such as manganese acetate, manganese benzoate, manganese lactate, manganese formate, and manganese tartrate; harogenated products such as manganese chloride, and manganese bromide; inorganic acid salts such as manganese nitrate, manganese carbonate, manganese phosphate, manganese sulfate, and manganese phosphate; alkoxides such as manganese methoxide; and acetylacetone manganese (II), acetylacetone manganese (III), manganese dioxide, manganese oxide, and the like. Among these, potassium permanganate may be preferably used in light of oxidation of the basal plate surface.

The source of the oxidized metal ion of Co is not particularly limited, and examples thereof include cobalt nitrate, cobalt sulfate, and the like.

The source of the oxidized metal ion of Ni is not particularly limited, and examples thereof include carbonates such as nickel (II) carbonate, basic nickel (II) carbonate, and acidic nickel (II) carbonate; phosphates such as nickel (II) phosphate and nickel pyrophosphate; nitrates such as nickel (II) nitrate and basic nickel nitrate; sulfates such as nickel (II) sulfate; oxides such as nickel (II) oxide, trinickel tetraoxide, and nickel (III) oxide; acetates such as nickel (II) acetate and nickel (III) acetate; oxalates such as nickel (II) oxalate; and nickel amidosulfate, acetylacetone nickel (II), nickel (II) hydroxide, and the like.

The source of the oxidized metal ion of Ce is not particularly limited, and examples thereof include cerium nitrate, cerium sulfate, and the like.

With respect to the content of the ion (f), it is preferred that the lower limit be 0.01% by mass and the upper limit be 10% by mass in the concentrated liquid. When the content is less than 0.01% by mass, the effect may not be achieved, while content greater than 10% by mass may result in instability of the concentrated liquid.

With respect to the content of the ion (f), it is preferred that the lower limit be 0.1 ppm and the upper limit be 1000 ppm in the surface conditioning treatment bath. When the content is less than 0.1 ppm, the effect may not be achieved, while content greater than 1000 ppm will not achieve additional effects.

A bivalent or trivalent metal nitrite compound can also be added to the surface conditioning composition according to the present embodiment as needed to still further suppress rust generation.

Into the surface conditioning composition according to the present embodiment may be further blended metal alkoxide, a deforming agent, a rust-preventive agent, an antiseptic agent, a thickening agent, an alkaline builder such as sodium silicate, and the like in a range not to inhibit the effect of the present invention, in addition to the components as described above. In order to compensate for uneven degreasing, various surfactants may be added to improve the wettability.

The surface conditioning composition according to the present embodiment can also include a dispersion solvent for allowing the zinc compound particles to be dispersed. Examples of the dispersion solvent include aqueous solvents containing 80% by mass or more water, and a variety of water soluble organic solvent can be used other than water; however, the content of the organic solvent is preferred to be as low as possible, which may account for preferably no more than 10% by mass, and more preferably no more than 5% by mass. A dispersion liquid without including any dispersion solvent other than water may also be provided.

The water soluble organic solvent is not particularly limited, and examples thereof include alcohol based solvents such as methanol, ethanol, isopropanol, and ethylene glycol; ether-based solvents such as ethylene glycol monopropyl ether, butyl glycol, and 1-methoxy-2-propanol; ketone-based solvents such as acetone, and diacetone alcohol; amide-based solvents such as dimethyl acetamide, and methylpyrrolidone; ester-based solvents such as ethyl carbitol acetate, and the like. These may be used alone, or two or more thereof may be used in combination.

To the surface conditioning composition according to the present embodiment may be further added an alkali salt such as calcined soda for the purpose of stabilizing the zinc compound particles, and forming a fine conversion coating film in the zinc phosphate chemical conversion treatment step to be carried out subsequently.

Surface Conditioning Method

The surface conditioning method according to the present embodiment is characterized by including the step of bringing the aforementioned surface conditioning composition in contact with a metal material surface. Hence, a sufficient amount of the zinc compound fine particles can adhere to the surface of not only iron-based and zinc-based metal materials, but also to the conversion resistant metal materials such as aluminum and high-tensile steel sheets. Accordingly, a favorable conversion coating film can be formed in the chemical conversion treatment step.

The process for bringing the surface conditioning composition into contact with the metal material surface in the surface conditioning method according to the present embodiment is not particularly limited, but a conventionally known method such as dipping, spraying and the like can be freely employed.

The metal material subjected to the surface conditioning is not particularly limited, but the process can be applied to a variety of metals generally subjected to the phosphate conversion treatment, such as galvanized steel sheets; aluminum-based metal materials such as aluminum or aluminum alloys; magnesium alloys; and iron-based metal materials such as cold-rolled steel sheets and high-tensile steel sheets. Particularly, it can be suitably applied to cold-rolled steel sheets and high-tensile steel sheets.

Moreover, using the surface conditioning composition as described above, a step of surface conditioning in combination with degreasing can also be carried out. Accordingly, the step for washing with water following a degreasing treatment can be omitted. In the aforementioned step of surface conditioning in combination with degreasing, a known inorganic alkali builder, an organic builder and the like may be added for the purpose of increasing the detergency. Also, a known condensed phosphate or the like may be added. In the surface conditioning as described above, the contact time of the surface conditioning composition with the metal material surface, and the temperature of the surface conditioning composition are not particularly limited, but the process can be performed under conventionally known conditions.

After carrying out the surface conditioning, the phosphate chemical conversion treatment is then carried out to enable production of a phosphate chemical conversion treated metal sheet. The process for the phosphate chemical conversion treatment is not particularly limited, but any one of various known processes such as a dipping treatment, a spraying treatment, or an electrolytic treatment can be employed. Multiple kinds of these treatments may be conducted in combination. In addition, with regard to the phosphate crystal coating film deposited on the metal material surface, it is not particularly limited as long as it is a metal phosphate, and examples thereof include zinc phosphate, iron phosphate, manganese phosphate, calcium phosphate and the like, but not in anyhow limited thereto. In the phosphate chemical conversion treatment, the contact time of the chemical conversion treatment agent with the metal material surface and the temperature of the chemical conversion treatment agent are not particularly limited, but can be carried out under conventionally known conditions.

After carrying out the aforementioned surface conditioning and chemical conversion treatment, a coated sheet can be produced by further carrying out coating. In general, electrodeposition coating is employed as the coating process. Paint for use in the coating is not particularly limited, but may be of various types generally used in coating a phosphate chemical conversion treated metal sheet, and examples thereof include epoxymelamine paints, as well as combination of cation electrodeposition paint, polyester-based intermediate coating paints, and polyester-based over coating paints, and the like. After the chemical conversion treatment, and prior to the coating, a known process may be employed such as a washing step.

Method for Production of Surface Conditioning Composition

The method for production of the aforementioned surface conditioning composition is characterized by including a step of allowing at least one kind of zinc compound particles selected from the group consisting of zinc oxide particles, zinc hydroxide particles, and basic zinc carbonate particles to be dispersed and stabilized by a dispersion means in an aqueous solution that contains the phosphoric acid and/or condensed phosphoric acid, and the amine compound (a), and has a pH of 7 to 13. Furthermore, by carrying out the dispersion and stabilization of the zinc compound particles in this step in the presence of the compounds (b) to (e) and the ion (f) described above, a surface conditioning composition that is more superior in the dispersion stability may be produced.

More specifically, the surface conditioning composition may be produced according to the following procedures. (i) The aforementioned zinc compound particles in a specified amount are added to pure water, and the mixture is subjected to prestirring for a specified time with a Disper or the like. When the zinc compound particles are added, the amine compound (a) is added in a specified amount at the same time. (ii) Dispersion is conducted using a dispersion means such as beads. (iii) Next, phosphoric acid and/or condensed phosphoric acid in a specified amount is gradually added over time while allowing for dispersion, followed by additional dispersion for a specified time. (iv) After diluting the thus resulting dispersion liquid with water to yield a desired zinc compound concentration, the desired surface conditioning composition is produced through adjusting the pH of the mixture.

EXAMPLES

The present invention is explained in more detail below by way of Examples, but not as to limit the present invention to these Examples. In the following Examples, unless otherwise stated, "part" and "%" represent "part by mass" and "% by mass", respectively.

Example 1

To 35 parts by mass of pure water were added 15 parts by mass of methyldiethanolamine (reagent) and 30 parts by mass of zinc hydroxide particles (reagent), and the mixture was subjected to prestirring using a Disper at 1500 rpm for 5 minutes. Next, dispersion was initiated with an SG mill having a filling ratio of zirconia beads (1 mm) of 80%. To this mixture was gradually added 20 parts by mass of pyrophosphoric acid (reagent) in order for the pH not to be less than 7, followed by additional dispersion for 180 minutes to obtain a dispersion liquid of the zinc compound fine particles. The thus resulting dispersion liquid was poured into a bath with pure water to give a zinc compound concentration of 0.1%, and the surface conditioning composition was obtained through adjusting the pH to 9 with NaOH.

Example 2

To 30 parts by mass of pure water were added 15 parts by mass of methyldiethanolamine (reagent) and 30 parts by mass of zinc hydroxide particles (reagent), and the mixture was subjected to prestirring using a Disper at 1500 rpm for 5 minutes. Next, dispersion was initiated with the SG mill having a filling ratio of zirconia beads (1 mm) of 80%. To this mixture was gradually added 25 parts by mass of phosphoric acid (reagent), followed by further adding dimethylethanolamine such that the pH after the addition was 10. Furthermore, dispersion was continued for additional 180 minutes to obtain the dispersion liquid of the zinc compound fine particles. The thus resulting dispersion liquid was poured into a bath with pure water to give a zinc compound concentration of 0.1%, and the surface conditioning composition was obtained through adjusting the pH to 9 with NaOH.

Example 3

To 47.5 parts by mass of pure water were added 7.5 parts by mass of methyldiethanolamine (reagent) and 30 parts by mass of basic zinc carbonate particles (reagent), and the mixture was subjected to prestirring using a Disper at 1500 rpm for 5 minutes. Next, dispersion was initiated with the SG mill having a filling ratio of zirconia beads (1 mm) of 80%. To this mixture was gradually added 15 parts by mass of pyrophosphoric acid (reagent), followed by further adding methyldiethanolamine such that the pH after the addition was 7.5. Furthermore, dispersion was continued for additional 180 minutes to obtain the dispersion liquid of the zinc compound fine particles. The thus resulting dispersion liquid was poured into a bath with pure water to give a zinc compound concentration of 0.1%, and the surface conditioning composition was obtained through adjusting the pH to 9 with NaOH.

Example 4

To 25 parts by mass of pure water were added 30 parts by mass of basic zinc carbonate particles (reagent), and the mixture was subjected to prestirring using a Disper at 1500 rpm for 5 minutes. To this mixture was added a mixture which had been prepared beforehand by neutralizing 15 parts by mass of pyrophosphoric acid (reagent) with dimethyl diethanolamine (reagent) in 10 parts by mass of pure water to give a pH of 7, and adding pure water to give a total amount of 45 parts by mass. Accordingly, the mixture was subjected to prestirring using a Disper at 1500 rpm for 5 minutes. Then, dispersion was continued with the SG mill having a filling ratio of zirconia beads (1 mm) of 80% for 180 minutes to obtain the dispersion liquid of the zinc compound fine particles. The thus resulting dispersion liquid was poured into a bath with pure water to give a zinc compound concentration of 0.1%, and the surface conditioning composition was obtained through adjusting the pH to 9 with NaOH.

Example 5

To 34 parts by mass of pure water were added 15 parts by mass of methyldiethanolamine (reagent) and 30 parts by mass of zinc hydroxide particles (reagent), and the mixture was subjected to prestirring using a Disper at 1500 rpm for 5 minutes. Next, dispersion was initiated with the SG mill having a filling ratio of zirconia beads (1 mm) of 80%. To this mixture was gradually added 20 parts by mass of pyrophosphoric acid (reagent) in order for the pH not to be less than 7, followed by additional dispersion for 180 minutes. Finally, 1 part by mass of gallic acid was added to the mixture, whereby a dispersion liquid of the zinc compound fine particles was obtained. The thus resulting dispersion liquid was poured into a bath with pure water to give a zinc compound concentration of 0.1%, and the surface conditioning composition was obtained through adjusting the pH to 9 with NaOH.

Comparative Example 1

To pure water were added 30 parts by mass of zinc phosphate particles (reagent), 1 part by mass of tribasic sodium phosphate (reagent), and 1 part by mass of finely powdered silica (manufactured by NIPPON AEROSIL CO., LTD., "Aerosil 300") to make 100 parts by mass. Next, dispersion was carried out with the SG mill having a filling ratio of zirconia beads (1 mm) of 80% for 180 minutes. The thus resulting dispersion liquid was poured into a bath with tap water to give a zinc phosphate concentration of 0.1%, and the surface conditioning composition was obtained through adjusting the pH to 9 with NaOH.

Comparative Example 2

To pure water were added 30 parts by mass of zinc phosphate particles (reagent) and 1 part by mass of carboxymethyl cellulose (CMC: manufactured by Nippon Paper Chemicals Co., Ltd., "Sunrose APP84") to make 100 parts by mass. Next, dispersion was carried out with the SG mill having a filling ratio of zirconia beads (1 mm) of 80% for 180 minutes. The thus resulting dispersion liquid was poured into a bath with tap water to give a zinc phosphate concentration of 0.1%, and the surface conditioning composition was obtained through adjusting the pH to 9 with NaOH.

Comparative Example 3

To pure water were added 30 parts by mass of zinc phosphate particles (reagent) and 1 part by mass of polyacrylic acid (manufactured by Nihon Junyaku Co., Ltd., "JURYMER AC10L") to make 100 parts by mass. Next, dispersion was carried out with the SG mill having a filling ratio of zirconia beads (1 mm) of 80% for 180 minutes. The thus resulting dispersion liquid was poured into a bath with tap water to give a zinc phosphate concentration of 0.1%, and the surface conditioning composition was obtained through adjusting the pH to 9.

Comparative Example 4

As a titanium-based surface conditioning composition, "Surf fine 5N10", manufactured by Nippon Paint Co., Ltd. was poured into a bath with tap water to give a concentration of 0.1%, and the surface conditioning composition was obtained through adjusting the pH to 9 with NaOH.

Comparative Example 5

To pure water were added 30 parts by mass of zinc phosphate particles (reagent), 3 parts by mass of a polyacrylic acid-based dispersant (manufactured by Toagosei Chemical Industry Co., Ltd. "Aron A6020"), and 1 part by mass of bentonite (reagent) to make a total of 100 parts by mass. Next, dispersion was carried out with the SG mill having a filling ratio of zirconia beads (1 mm) of 80% for 180 minutes. The thus resulting dispersion liquid was poured into a bath with tap water to give a zinc phosphate concentration of 0.1%, and the surface conditioning composition was obtained through adjusting the pH to 9 with NaOH.

Production of Test Plate 1

A cold-rolled steel sheet (SPC) (70 mm×150 mm×0.8 mm), a high-tensile steel sheet (70 mm×150 mm×1.0 mm), as well as an aluminum sheet (70 mm×150 mm×1.0 mm) and a galvanized steel sheet (GA) (70 mm×150 mm×0.8 mm), which had been laid on each half and fixed by clamping with clips on two sides to provide an aluminum-electrically modified part (a part where the aluminum and galvanized steel sheets were in contact), were prepared. Each was subjected to a degreasing treatment using a degreasing agent ("SURF-CLEANER EC92", trade name, manufactured by Nippon Paint Co., Ltd.) at 40° C. for 2 minutes. Then, using each of the surface conditioning compositions of Examples 1 to 5 and Comparative Examples 1 to 5 obtained as described above, the surface conditioning treatment was carried out at room temperature for 30 seconds. The constitutions of the surface conditioning compositions obtained as in the abovementioned are shown in Table 1. Subsequently, each metal sheet was subjected to a chemical conversion treatment using a zinc phosphate treatment liquid ("SURFDINE 6350", trade name, manufactured by Nippon Paint Co., Ltd.) by a dipping method at 35° C. for 2 minutes, followed by washing with water, washing with pure water, and drying to obtain a test sheet.

Evaluation Test

According to the following methods, average particle diameter, dispersion stability, and working properties of the resulting surface conditioning compositions were determined, and various evaluations of the test sheets thus obtained were conducted.

Average Particle Diameter of Zinc Phosphate Particles

With respect to the average particle diameter of the zinc phosphate particles included in the surface conditioning compositions obtained in Examples 1 to 5 and Comparative Examples 1 to 5, determination was conducted using an electrophoretic light scattering photometer ("Photal ELS-800", trade name, manufactured by OTSUKA ELECTRONICS CO., LTD.). The results are shown in Table 1.

Zinc Phosphate Crystal

Whether or not crystals of zinc phosphate were generated in Examples was ascertained by X-ray diffractometric determination. For the determination, an X-ray diffractometer "GeigerFlex RAD-2B" manufactured by Rigaku Corporation was used. The results are shown in Table 1.

Amount of Conversion Coating Film

Using a fluorescent X-ray measuring apparatus ("XRF-1700", trade name, manufactured by Shimadzu Corporation), the mass of the conversion coating film was measured with the amount of element P included in the conversion coating film obtained in Examples and Comparative Examples as a marker. The results are shown in Table 1.

Crystal of Coating Film

The appearance of the crystals of the conversion coating film obtained in Examples and Comparative Examples was visually evaluated on the basis of the following standards. In addition, the size of the crystals of the formed conversion coating film was measured with an electron microscope "JSM-5600LV" manufactured by JEOL DATUM LTD. The results are shown in Table 1.

A: uniformly and finely formed on the entire face
B: roughly formed on the entire face
C: not formed in parts
D: almost no conversion coating film formed Working Properties With respect to the working properties, evaluation was made in light of chemical conversion unevenness, generation of rust, and average particle diameter attained by dispersion for a short period of time. The evaluation standards or evaluation method of each evaluation were as follows. The evaluation of the chemical conversion unevenness and generation of rust was made using the conversion coating film formed on SPC.

Chemical Conversion Unevenness

A: unevenness found among parts subjected to the chemical conversion treatment with vigorous stirring and other parts B: slight unevenness found among parts subjected to the chemical conversion treatment with vigorous stirring and other parts C: almost no unevenness found among parts subjected to the chemical conversion treatment with vigorous stirring and other parts Generation of Rust A: no rust generated B: slight rust stains generated C: rust stains generated on the entire surface Average Particle Diameter Attained by Dispersion for a Short Period of Time On each of the Examples and Comparative Examples, the average particle diameter 60 minutes after initiation of the dispersion was measured using an electrophoretic light scattering photometer ("Photal ELS-800", trade name, manufactured by OTSUKA ELECTRONICS CO., LTD.). In the Table, "-" represents that the evaluation was not made.

Dispersion Stability

The surface conditioning compositions obtained in the Examples and Comparative Examples were left to stand at 40° C. for 30 days, and the appearance and performance were then evaluated according to the following standards. The evaluation was made at a concentration of 30% and 45%, respectively. The results are shown in Table 1.

A: no abnormal appearance found, without alteration of the chemical conversion performance from the initial product B: visible separation, without alteration of the chemical conversion performance from the initial product C: sedimentation found, chemical conversion failed -: not evaluated Corrosion Resistance The conversion coating films (SPC used) obtained in the Examples and Comparative Examples were sealed with a tape, and cross cuts were made with a cutter, whereby a CCT test was carried out. More specifically, in a saline spray test device maintained at a temperature of 35° C. with a humidity of 95%, a 5% aqueous solution of NaCl maintained at a temperature of 35° C. was continuously sprayed for 2 hours. Next, after drying under the conditions of a temperature of 60° C. with a humidity of 20 to 30% for 4 hours, the test piece was maintained under humid conditions at 50° C. with a humidity of 95% or higher for 2 hours. These steps were specified as one cycle, and the width of the blister of the coated film was measured following 200 cycles. The results are shown in Table 1.

TABLE 1

| | Zinc compound | Acid | Amine | Additive | pH | Particle Diameter (μM) | XD (X-ray diffraction) | SPC Coating Film Crystal | SPC Amount of Coating Film |
|---|---|---|---|---|---|---|---|---|---|
| Example 1 | zinc hydroxide (30) | pyrophosphoric acid (20) | MDEA(15) | — | 9 | 0.3 | broad ZnO | A | 1.2 |
| Example 2 | zinc hydroxide (30) | phosphoric acid (25) | MDEA(15) | DMEA (10) pH adjusted | 9 | 0.39 | broad ZnO | B | 1.9 |
| Example 3 | basic zinc carbonate (30) | pyrophosphoric acid (15) | MDEA(7.5) | MDEA (7.5) pH adjusted | 9 | 0.41 | $Zn_5(OH)_6(CO_3)_2$ | B | 1.9 |
| Example 4 | basic zinc carbonate (30) | pyrophosphoric acid DMEA neutralized pH 7 (45) | | — | 9 | 0.34 | $Zn_5(OH)_6(CO_3)_2$ | B | 1.9 |
| Example 5 | zinc hydroxide (30) | pyrophosphoric acid (20) | MDEA(15) | gallic acid (1) | 9 | 0.38 | amorphous | A | 1.2 |
| Comparative Example 1 | zinc phosphate (30) | tribasic phosphoric acid Na(1) | — | $SiO_2$(1) | 9 | 8 | $Zn_3(PO_4)_2(H_2O)_4$ | adhesion not found | adhesion not found |
| Comparative Example 2 | zinc phosphate (30) | — | — | CMC(1) | 9 | 0.7 | $Zn_3(PO_4)_2(H_2O)_4$ | B | 2.3 |
| Comparative Example 3 | zinc phosphate (30) | — | — | polyacrylic acid (1) | 9 | 0.6 | $Zn_3(PO_4)_2(H_2O)_4$ | B | 2.2 |
| Comparative Example 4 | Surf line 5N-10 | | | | 9 | — | — | B | 2.1 |
| Comparative Example 5 | zinc phosphate (30) | — | — | acrylic acid-based dispersant (3) bentonite (1) | 9 | 0.7 | $Zn_3(PO_4)_2(H_2O)_4$ | A | 1.7 |

| | High-tensile Steel Plate Coating Film Crystal | Al-electrically modified part Coating Film Crystal | Al-electrically modified part Amount of Coating Film | Working properties Coating Film Unevenness | Working properties Rust | Dispersion for a Short Period | Stability 30% | Stability 45% | Corrosion Resistance |
|---|---|---|---|---|---|---|---|---|---|
| Example 1 | A | A | 1.3 | A | A | 0.5 | — | — | 8 |
| Example 2 | B | B | 1.1 | A | A | 0.52 | A | A | 8 |
| Example 3 | B | B | 1 | A | A | 0.55 | A | A | 9 |
| Example 4 | B | B | 1 | A | A | 0.52 | A | A | 9 |
| Example 5 | A | A | 1.2 | A | A | 0.57 | A | A | 9 |
| Comparative Example 1 | adhesion not found | adhesion not found | adhesion not found | adhesion not found | adhesion not found | — | B | solidified | — |
| Comparative Example 2 | C rust | adhesion not found | adhesion not found | B | B | 1.35 | A | solidified | 12 |
| Comparative Example 3 | C rust | adhesion not found | adhesion not found | B | C | 1.29 | A | solidified | 12 |

TABLE 1-continued

| | | | | | | | | | | |
|---|---|---|---|---|---|---|---|---|---|---|
| Comparative Example 4 | C rust | adhesion not found | adhesion not found | A | A | — | Powder | Powder | 12 | |
| Comparative Example 5 | B | C | 0.6 | C | C | 1.38 | A | solidified | 11 | |

Figure 3:
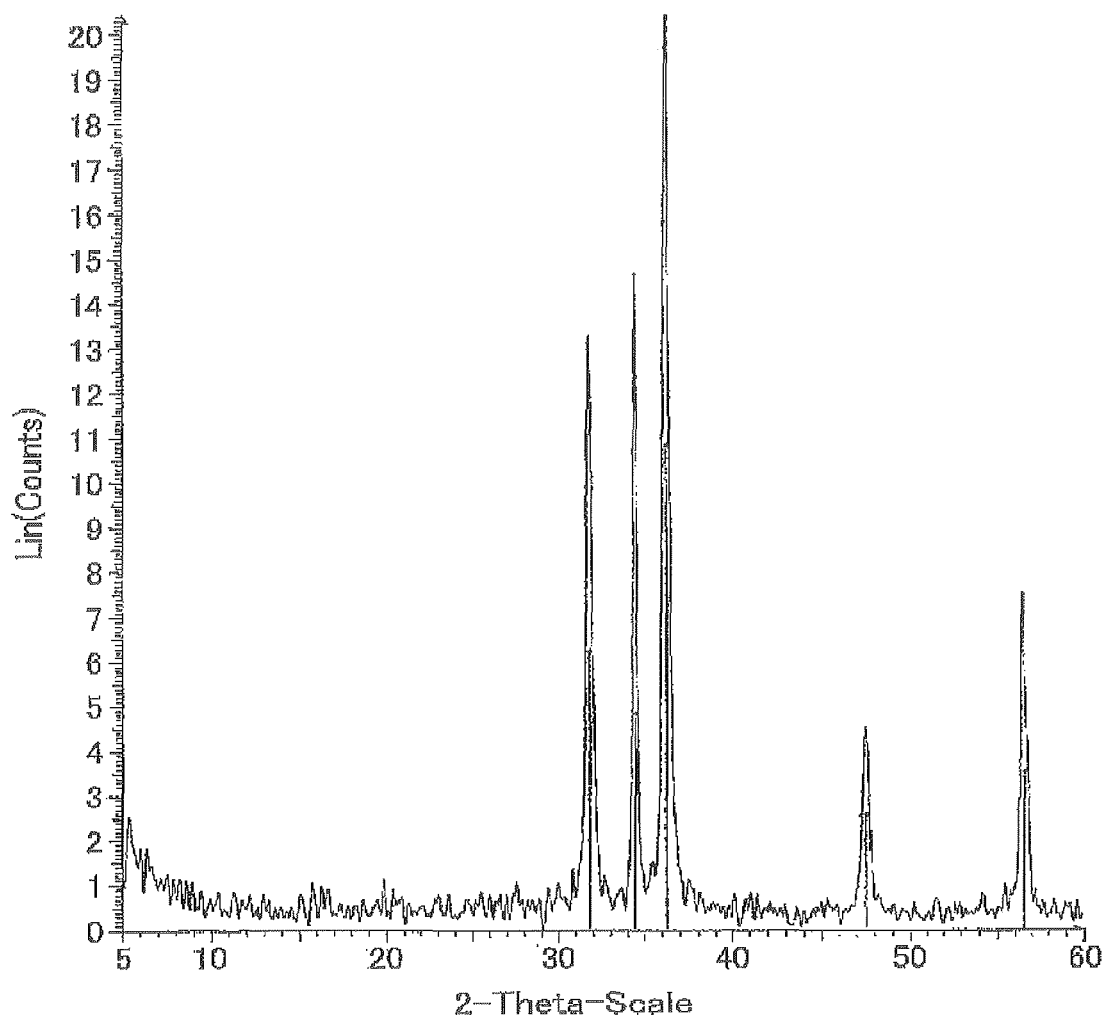
FIG. 3 shows an X-ray diffraction spectrum according to Example 1.
Figure 4:
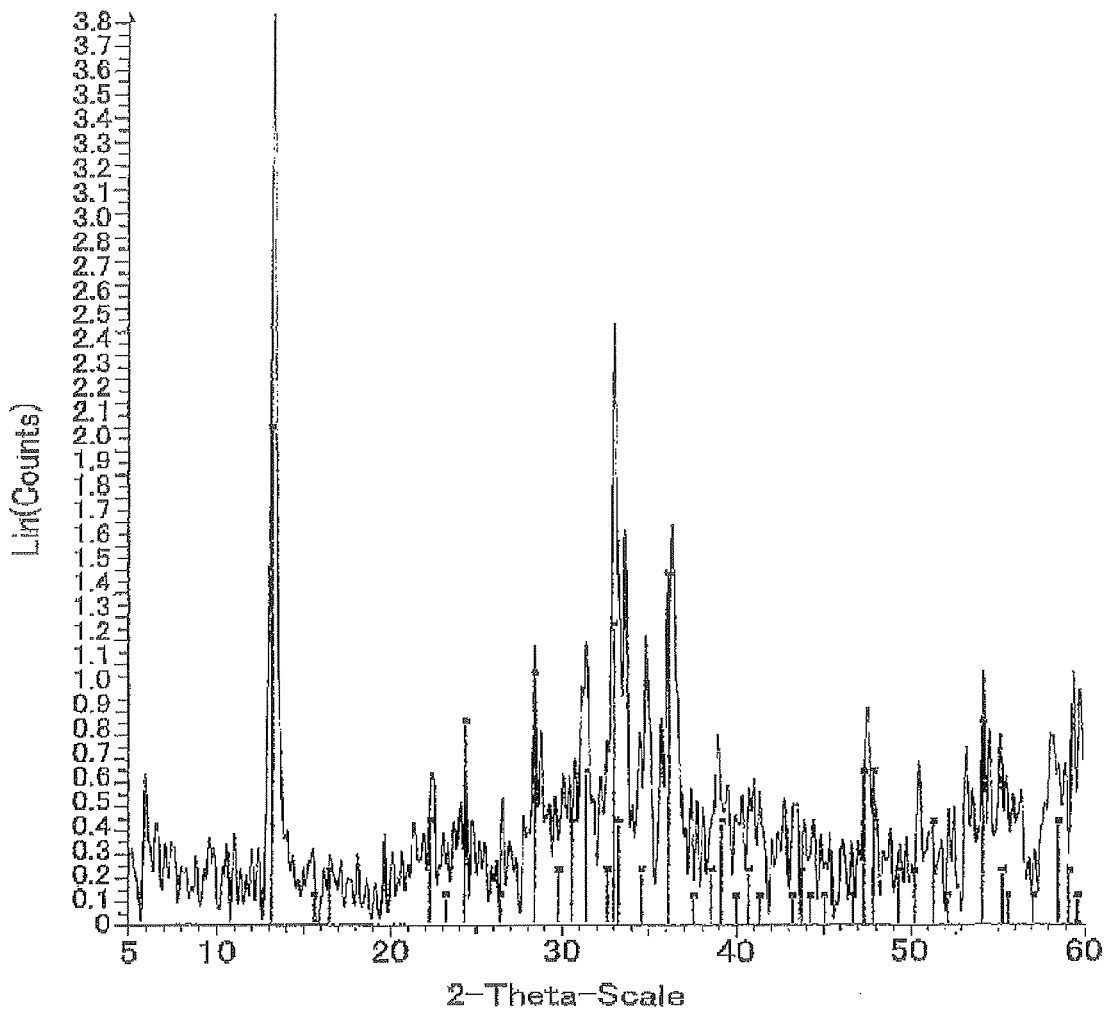
FIG. 4 shows an X-ray diffraction spectrum according to Example 3.

As typical examples, the X-ray diffraction spectra of Example 1 and Example 3 are shown in FIG. 3 and FIG. 4, respectively. From these Figures, it was ascertained that the zinc oxide particles in Example 1 and the basic zinc carbonate particles in Example 3 were dispersed and stabilized without reaction. Moreover, as shown in Table 1, it was proven that the dispersion stability of the zinc compound particles was extremely favorable, and additionally, the working properties were also satisfactory when the surface conditioning composition of the present Example was used when compared with the case in which the surface conditioning composition of Comparative Example was used. In addition, it was verified that a favorable conversion coating film could be formed on all of the cold-rolled steel sheets, the high-tensile steel sheets, and the aluminum-electrically modified part.

The invention claimed is:

1. A metal surface conditioning composition comprising:
a zinc compound particles comprising selected from a group consisting of zinc oxide, zinc hydroxide, and basic zinc carbonate;
at least one of phosphoric acid or condensed phosphoric acid; and
an amine compound of formula (1):

(1)

wherein the zinc compound particles are dispersed and stabilized by at least one of the phosphoric acid or condensed phosphoric acid, and the amine compound,
wherein $R^1$, $R^2$, and $R^3$ each independently represent a hydrogen atom, a straight or branched alkyl group having 1 to 10 carbon atoms, or a straight or branched alkyl group having 1 to 10 carbon atoms and having a hydrophilic functional group in the skeleton thereof, but $R^1$, $R^2$, and $R^3$ are not all a hydrogen atom, the surface conditioning composition has a pH of from 7 to 11, wherein the zinc phosphate particles have not been pulverized compound particles, are of nearly uniform spherical shape, wherein zinc phosphate particles are not the main ingredient and the zinc compound particles are the main ingredient, and wherein the zinc compound particles have an average particle diameter of 0.05 μm to 3 μm.

2. The metal surface conditioning composition according to claim 1, wherein the condensed phosphoric acid is pyrophosphoric acid.

3. The metal surface conditioning composition according to claim 1, wherein the hydrophilic functional group is a hydroxyl group.

4. The metal surface conditioning composition according to claim 1, wherein the amine compound is a tertiary alkanol amine.

5. The metal surface conditioning composition according to claim 1, further comprising at least one selected from a group consisting of an aromatic organic acid, a phenolic compound, and a phenolic resin.

6. The metal surface conditioning composition according to claim 1, further comprising at least one selected from a group consisting of a clay compound, fine particles of an oxide, and a water soluble thickening agent.

7. The metal surface conditioning composition according to claim 1, further comprising at least one selected from a group consisting of a water soluble carboxyl group-containing resin, a saccharide, and a phosphonic acid compound.

8. The metal surface conditioning composition according to claim 1, further comprising at least one of chelating agent or a surfactant.

9. The metal surface conditioning composition according to claim 1, further comprising at least one of a zirconium complex ion or an oxidized metal ion.

10. A method comprising bringing the metal surface conditioning composition according to claim 1 into contact with a metal surface prior to said metal surface being subjected to a phosphate-based chemical conversion treatment.

11. A method comprising producing a metal surface conditioning composition comprising dispersing zinc compound particles comprising at least one member selected from the group consisting of zinc oxide particles, zinc hydroxide particles, and basic zinc carbonate particles in an aqueous solution having a pH of from 7 to 11, wherein said aqueous solution comprises an amine compound and at least one of phosphoric acid or condensed phosphoric acid, wherein the amine compound is of formula (1):

(1)

wherein $R^1$, $R^2$, and $R^3$ each independently represent a hydrogen atom, a straight or branched alkyl group having 1 to 10 carbon atoms, or a straight or branched alkyl group having 1 to 10 carbon atoms and having a hydrophilic functional group in the skeleton thereof, wherein not each of $R^1$, $R^2$, and $R^3$ are hydrogen, wherein the zinc compound particles have not been pulvurized, wherein the zinc compound particles are of a nearly uniform spherical shape, wherein stabilization of the dispersion is enabled without using a dispersant wherein zinc phosphate particles are not the main ingredient and the zinc compound particles are the main ingredient, and wherein the zinc compound particles have an average particle diameter of 0.05 μm to 3 μm.

12. The metal surface conditioning composition according to claim 1, wherein the at least one particulate zinc compound is zinc oxide.

13. The metal surface conditioning composition according to claim 1, wherein the at least one particulate zinc compound is zinc hydroxide.

14. The metal surface conditioning composition according to claim 1, wherein the at least one particulate zinc compound is basic zinc carbonate.

15. A surface conditioning composition comprising zinc compound particles comprising at least one member selected from the group consisting of zinc oxide particles, zinc hydroxide particles, and basic zinc carbonate particles,
  wherein the zinc compound particles are dispersed and stabilized by coordination of at least one member selected from the group consisting of phosphoric acid and condensed phosphoric acid, and an amine compound;
  wherein the zinc compound particles have a nearly spherical uniform shape; said surface conditioning composition having a pH of from 7 to 11,
  wherein the zinc compound particles have an average particle diameter from 0.5 μm to 3 μm, and
  wherein zinc phosphate particles are not used as the main ingredient and the zinc compound particles are the main ingredient.

* * * * *